US007621074B2

(12) United States Patent
Glidewell et al.

(10) Patent No.: US 7,621,074 B2
(45) Date of Patent: Nov. 24, 2009

(54) TACKLE BOX FOR SUSPENDED STORAGE

(76) Inventors: Darrell L. Glidewell, 1418 Crownhill Dr., Arlington, TX (US) 76012; Billy D. Horton, Jr., 7138 Harlan Dr., Rockwall, TX (US) 75087

( * ) Notice: Subject to any disclaimer, the term of this patent is extended or adjusted under 35 U.S.C. 154(b) by 412 days.

(21) Appl. No.: 11/187,648

(22) Filed: Jul. 22, 2005

(65) Prior Publication Data
US 2007/0017146 A1   Jan. 25, 2007

(51) Int. Cl.
*A01K 97/06* (2006.01)
(52) U.S. Cl. .......................................... 43/57.1
(58) Field of Classification Search ................. 43/54.1, 43/57.1; 206/315.11
See application file for complete search history.

(56) References Cited
U.S. PATENT DOCUMENTS

| | | | | | |
|---|---|---|---|---|---|
| 1,482,678 | A | * | 2/1924 | Figley | 43/57.1 |
| 1,963,502 | A | * | 6/1934 | Phillips | 43/57.1 |
| 2,316,833 | A | | 4/1943 | Baron | |
| 2,364,807 | A | * | 12/1944 | Nelson, Jr. | 43/57.1 |
| 2,578,181 | A | | 12/1951 | Edmunds | |
| 2,608,459 | A | * | 8/1952 | Malmquist | 312/351 |
| 2,711,050 | A | * | 6/1955 | Mcintyre | 43/57.1 |
| 2,846,806 | A | | 8/1958 | Gaines | |
| 3,146,544 | A | | 9/1964 | MacKay | |
| 3,350,810 | A | * | 11/1967 | Warner et. al. | 43/57.1 |
| 3,481,066 | A | * | 12/1969 | Woolworth | 43/57.1 |
| 3,775,895 | A | | 12/1973 | Jachim | |
| 3,797,161 | A | | 3/1974 | Smallwood | |
| 3,948,579 | A | * | 4/1976 | Schirmer | 312/111 |
| 4,238,901 | A | | 12/1980 | Martinet et al. | |
| 4,240,222 | A | * | 12/1980 | Covington | 43/57.1 |
| 4,245,422 | A | * | 1/1981 | Souza | 43/57.1 |
| 4,589,546 | A | * | 5/1986 | Sunderland | 206/315.11 |
| 4,742,640 | A | * | 5/1988 | Moore | 43/57.1 |
| 4,756,412 | A | * | 7/1988 | Graves et al. | 206/315.11 |
| 4,769,941 | A | | 9/1988 | Schmidt | |
| 4,958,730 | A | | 9/1990 | Bunten | |
| 5,054,669 | A | * | 10/1991 | Zimbardi et al. | 224/406 |
| 5,185,952 | A | * | 2/1993 | Bruce | 43/57.1 |
| 5,289,940 | A | * | 3/1994 | Wisenbaugh | 220/507 |
| 5,605,005 | A | | 2/1997 | Maraman | |
| 5,829,185 | A | | 11/1998 | Myers | |
| 5,996,273 | A | | 12/1999 | George | |
| 6,009,660 | A | | 1/2000 | Rice | |
| 6,134,825 | A | | 10/2000 | Moffett et al. | |
| 6,256,925 | B1 | | 7/2001 | Blackburn | |

FOREIGN PATENT DOCUMENTS

EP       0 071 274 A2     7/1982

* cited by examiner

*Primary Examiner*—Kurt Rowan
(74) *Attorney, Agent, or Firm*—Eugenia S. Hansen; Hemingway & Hansen

(57) ABSTRACT

A novel tackle box is disclosed which employs hook attaching means comprising a vertical slot adapted to receive the hooks of artificial fishing bait. The hook attaching means are secured to the top inside of the tackle box or to one or more horizontal shelves in said box so that any bait stored is suspended during storage. Suspension allows for drying of the tackle and prevention of rust. The tackle may be easily inserted and easily removed from the slots. The box provides an effective storage means and method especially for unwieldy and cumbersome baits.

10 Claims, 4 Drawing Sheets

TACKLE BOX FOR SUSPENDED STORAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to storage of artificial fishing lures and hooks.

BACKGROUND OF THE INVENTION

Fishing is a popular sport and commercial venture, and specialized lures for attracting fish are widely used. Many of these lures are fairly unwieldy and susceptible to tangling during transport to the fishing site. In addition, the hooks employed in lures should be secured to prevent injury to the human users of these devices. So called "spinners" are particularly difficult to store due to one or more dangling components.

Consequently, several designs for tackle boxes have been reported in the art. Where some organizational features have been provided in tackle boxes, a need continued for a tackle box that would allow lures to dry, and provide ease of insertion and removal.

SUMMARY OF THE INVENTION

In an embodiment, the invention is a storage system for artificial fishing bait attached to a hook, comprising a container and one or more horizontal planar surfaces attached to said inside wall so that said horizontal planar surface extends across said container. Hook securing members comprising a top plane and a vertical plane extending downwardly from said top plane are attached to said horizontal planar surfaces. The vertical plane of the hook securing member defines a slot adapted to receive fishing hooks of artificial bait, whereby said hooks may be removably hung on said slot so that the hook will be nearer the top of said container than the remainder of said bait. This allows the bait to be stored in a suspended fashion.

DETAILED DESCRIPTION OF THE PREFERRED EMBODIMENTS

Figure 1:
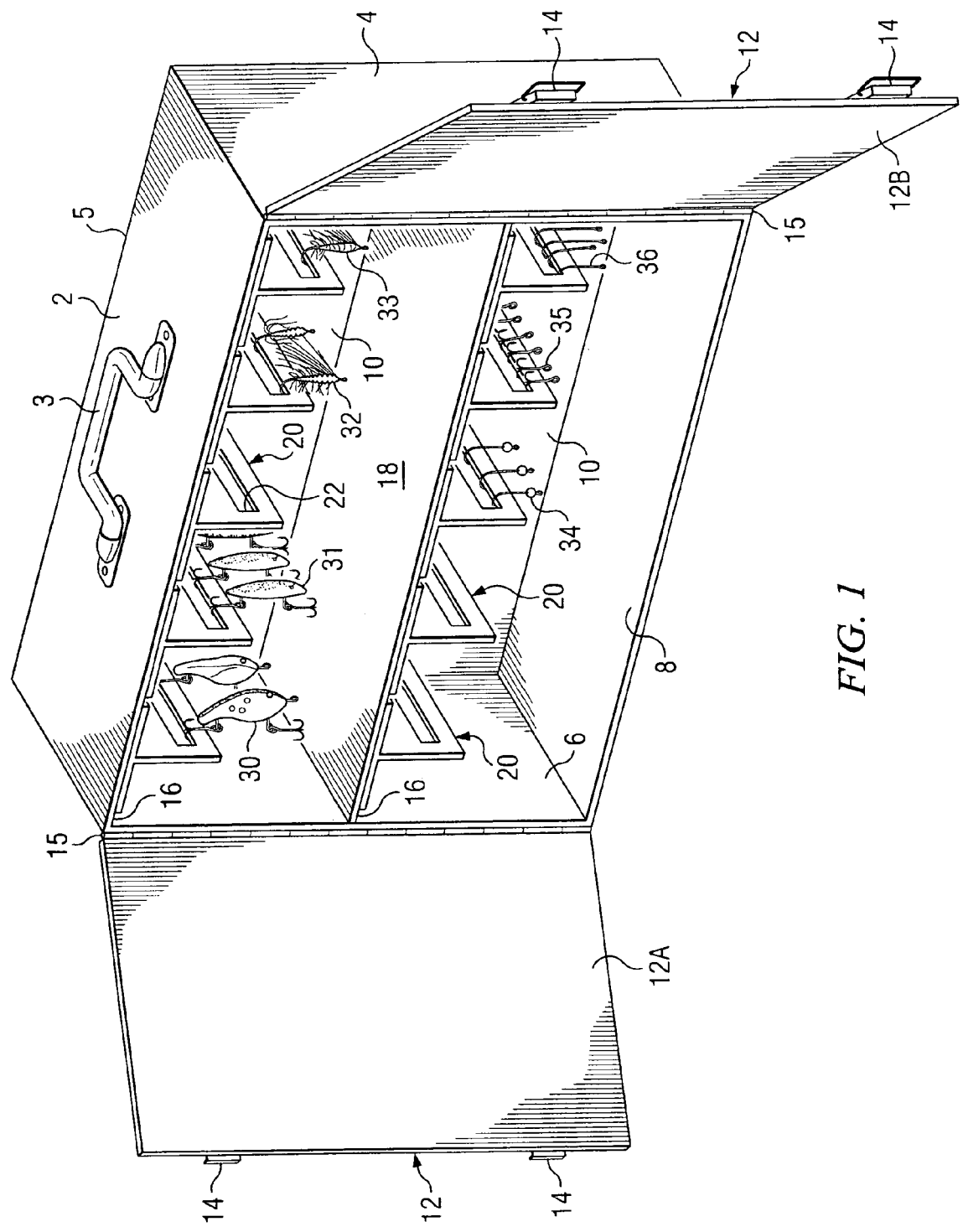
FIG. 1 is a perspective view of a preferred tackle box, showing two rows of hook attaching members inside the tackle box and a door comprising two sections opening outwardly from a generally central line.

A novel tackle box is herein disclosed which provides for suspension of artificial fishing lures and ease of insertion and removal of these lures.

The invention comprises a tackle box which may be of any configuration but which is preferably generally a rectangular container. Other configurations can be used such as a cylindrical container or a circular container as long as it is possible to provide for the suspension of baits.

The tackle box comprises an opening and a door or lid which may be opened and closed and which in open position provides access to the tackle and which in closed position covers the tackle box opening and secures the contents of the tackle box for transport and the like. It is convenient to provide a handle secured to the outside of the box for ease of transport.

Inside the tackle box are provided one or more horizontal shelves which comprise horizontal planes to which hook attaching members can be secured. The hook attaching members are generally "T-shaped" and comprise a top plane and a vertical plane extending downward from the top plane. The vertical plane comprises a slot which is horizontal in nature and which generally extends from the tackle box door opening to the rear of the tackle box. The slot is adapted to receive the hooks of artificial lures. The top plane of the hook attaching members can be firmly and statically attached to the horizontal plane of the tackle box, or can be slidably disposed in a bracket adapted to receive the top plane of the hook attaching member. One or more rows of hook attaching members can be provided on each shelf in the tackle box. In a preferred embodiment, 5-6 hook attaching members are provided on each shelf, and each shelf allows for a 4-inch clearance for the baits to suspend downwardly from the hook attaching members.

Optionally, the horizontal planes may be slidably disposed in brackets provided in the tackle box interior or may be attached in a static manner. Multiple brackets may optionally be provided so that the area in which the baits will be suspended can be adjusted by the user. The tackle box may also be provided with a drawer for keeping miscellaneous items. As another optional feature, an attaching means may be provided on the outside of the tackle box that can engage with a receiving means which may be installed on a boat or dock. This feature allows the user to transport the box to the fishing location and to secure it in an upright position during fishing. The attaching means can slide into or lockingly engage with the receiving means.

In another embodiment, a portable tackle box suitable for holding 1-10 artificial lures may be provided with a means for attachment to a belt or waistband of the user. In this embodiment, one to two hook attaching means would be provided.

The tackle box may be made of any material, but preferably is made from molded plastic so that it is lightweight yet sturdy. Techniques for molding the component parts of the tackle box are well known in the art.

Figure 3:
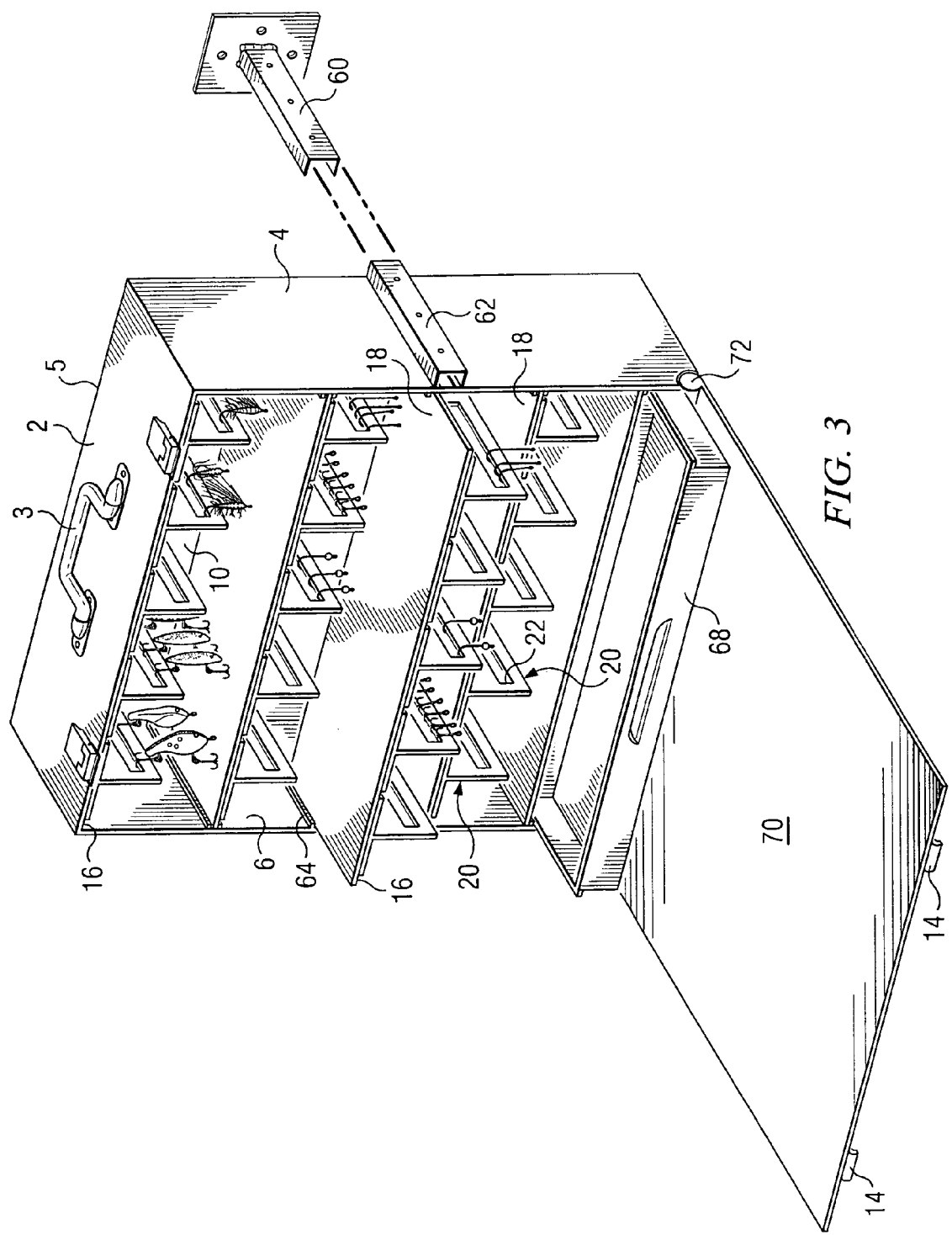
FIG. 3 is a perspective view of a tackle box illustrating alternative components that may be employed in addition to or instead of the components illustrated in FIG. 1.

Now referring to the Figures illustrative of the invention. FIGS. 1 and 3 are versions of preferred embodiments, a vertically oriented tackle box 5 with rows of hook attaching members 20 inside the box. The tackle box 5 is comprised of a top 2 and bottom 8, two opposing side panels 4 and 6, a door 12 or 70, and a back panel 10. The tackle box also preferably has a handle 3 for carrying, located on the top panel 2.

In FIG. 1, the door is comprised of two panels 12A and 12B hinged on vertical axis 15. The panels swing out to the side in opposite direction and close in the center and may be secured with latches 14. Alternately, FIG. 3 shows the door as a single panel 70 on a horizontal axis 72, opening by dropping down perpendicular to side panels 4 and 6 and away from the top 2. Door 70 may be secured to top 2 with latches 14 when in closed position.

Also shown in FIG. 3 is an optional side bracket 62, attached to the outside surface of side panel 4 and/or side panel 6 (not shown). Side bracket 62 has a corresponding mounting bracket 60. The mounting bracket 60 can be attached to a vertical surface, such as on a boat or a dock. The user can attach side bracket 62 to mounting bracket 60, to secure the tackle box and prevent tipping.

Also shown in FIG. 3 is optional sliding drawer 68 to hold miscellaneous items.

The inside of tackle box 5 has at least one horizontal shelf 18. The underside of the shelf 18, and/or inside of the top panel 2, comprise the horizontal planes 16 to which the hook attaching members 20 can be secured. The horizontal interior planes 16 run the entire length and width of the inside dimensions of the tackle box. Hook attaching members 20 hang perpendicularly from each of these horizontal planes. As shown in FIG. 3, the entire horizontal shelf 18 can also be mounted on brackets 64, to allow the user to slide out the shelf for removal and replacement of the shelf as a whole.

FIGS. 2 and 4 show the hook attaching members 20 in greater detail. The hook attaching members are "T-shaped" and generally extend the depth of the tackle box 5. The top plane 21 of the members attaches in a parallel fashion to the underside of the horizontal interior planes 16. The vertical plane 23 of the members hangs perpendicularly downwards from plane 21 and consequently from the horizontal interior planes 16. A slot 22 in the vertical plane 23 is adapted to receive hooks for various fishing tackle, including but not limited to baits and hooks 30, 31, 32, 33, 34, 35 and 36. When the tackle is hooked onto slot 22, it is stored in a suspended manner which allows for thorough drying of the tackle and the prevention of rusting.

Figure 2A:
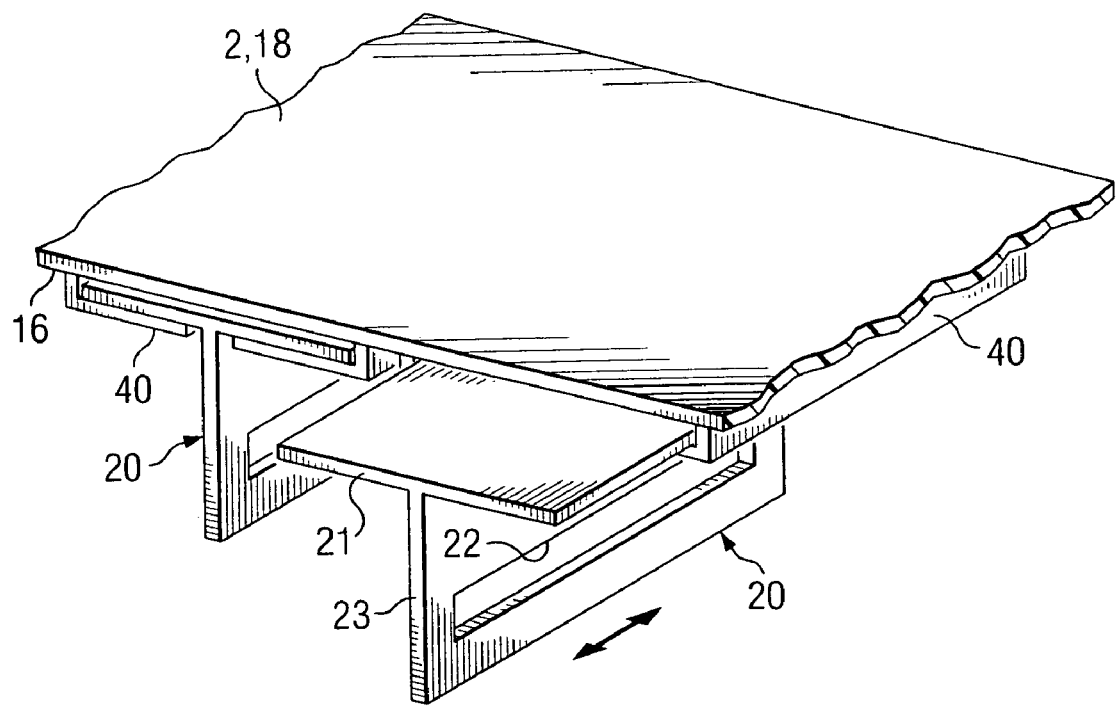
FIG. 2A is a partial perspective view of a tackle box illustrating hook attaching members slidably disposed in a bracket attached to horizontal panels.
Figure 2B:
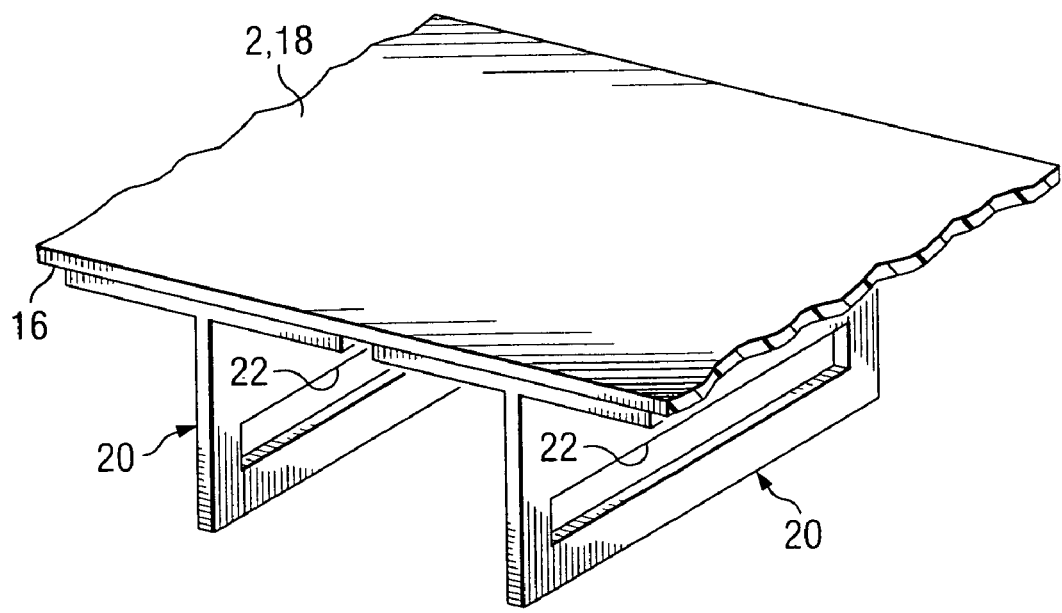
FIG. 2B is a partial perspective view of a tackle box illustrating hook attaching members secured to a horizontal plane.

As shown in FIG. 2A, the hook attaching members 20 can be attached to the horizontal plane 16 by brackets 40, which allow the user to slide the hook attaching members in and out for easy access. Alternatively, as shown in FIG. 2B, the hook attaching members 20 can be fastened directly and immovably to the horizontal plane 16.

Figure 4A:
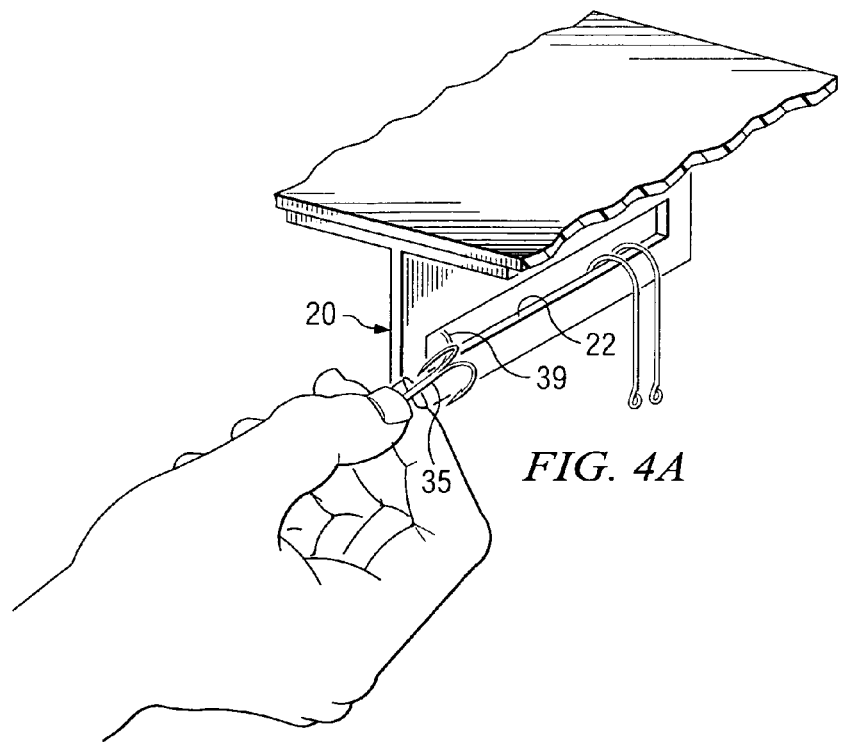
FIG. 4 is a partial perspective view of the tackle box illustrating a user hooking a treble hook onto the hook attaching member.
Figure 4B:
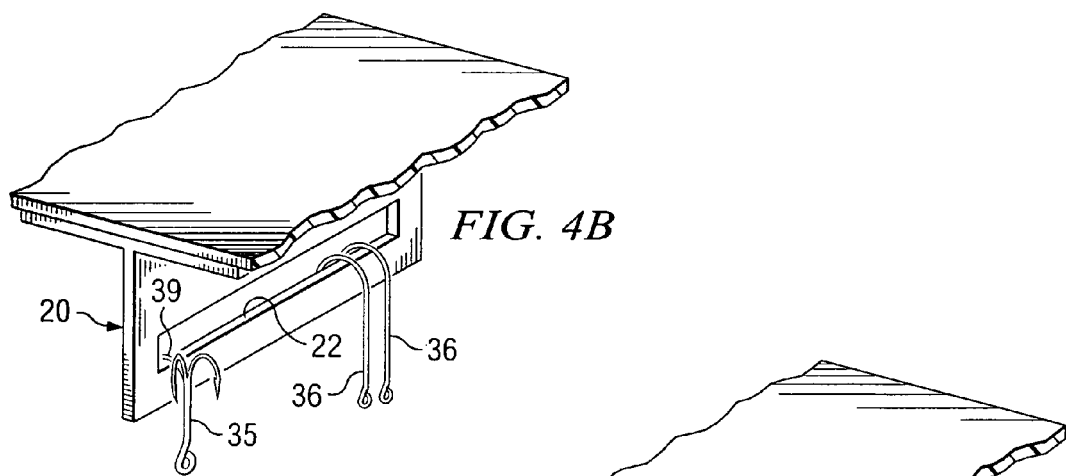

FIG. 4A shows a user hooking a treble hook 35 onto the hook attaching member 20. In this example, one prong 39 is placed inside the slot 22. FIG. 4B demonstrates how the treble hook 35 hangs, with a prong 39 through the slot 22 in the same manner as hooks 36.

Figure 5:
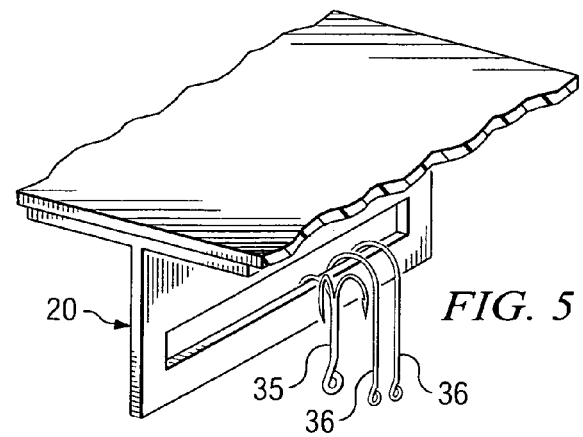
FIG. 5 is a partial perspective view of a tackle box illustrating optimal storage conditions.

FIG. 5 shows how a tackle hook 35 or 36, when a prong 39 is placed through the slot 22 in the hook attaching member, can be slid along the hook-attaching member 20. This would allow the user maximum space for hanging multiple tackle in a similar fashion.

We claim:

1. A storage system for artificial fishing bait attached to a hook, comprising:
    a container having a vertical inside wall, a container inside top surface and a container inside bottom surface;
    a first horizontal planar shelf attached to said vertical inside wall so that said horizontal planar shelf extends across said container, said first horizontal planar shelf having a top and a bottom;
    hook securing members comprising a top plane and a vertical plane extending downwardly from said top plane, said vertical plane defining a slot adapted to removably hang hooks of artificial bait on said slot thereby suspending said bait, said top plane secured to said bottom of said first horizontal planar shelf, further comprising hook securing members attached to said container inside top surface and wherein said first horizontal planar shelf is located a sufficient distance from said container inside top surface to permit artificial bait hung on said hook securing members attached thereto to be suspended above said first horizontal planar shelf.

2. The system of claim 1, wherein said tackle box further comprises one or more brackets attached to said inside vertical wall adapted to receive said horizontal shelf and into which said shelf is slidably disposed.

3. The system of claim 1, further comprising a two piece attaching means comprising a first piece and a second piece, said first piece attached to the outside wall of said tackle box and said second piece adapted to be attached to a wall or object so that said first piece may engage with said second piece thereby securing said tackle box in an upright position.

4. A molded plastic fishing box, comprising:
    a generally rectangular container having a vertical inside wall, a horizontal container top having an inside wall, a horizontal container bottom having an inside wall and a vertical door;
    one or more horizontal planar shelves attached to said vertical inside wall so that each of said horizontal planar shelves extends across said container, each of said horizontal planar shelves having a top and a bottom;
    one or more hook securing strips having a top horizontal plane and a vertical plane extending downwardly from said top horizontal plane, said top plane attached to one or more of said bottom surfaces of said horizontal planar shelves, said strips having slots defined by said vertical plane adapted to removably secure hooks of artificial fishing bait thereby suspending said bait and said strips sufficiently long to span the approximate depth of said container wherein said top horizontal plane of said hook securing strips are attached to said container top inside wall, and said horizontal planar shelves are positioned a sufficient distance from said container top inside wall to permit suspension of said artificial fishing bait from said hook securing strips attached thereto.

5. The box of claim 4, wherein four to eight strips are attached to each of said horizontal planar shelves, and wherein there are 2-3 horizontal planar shelves attached to said box.

6. The box of claim 4, wherein two to sixty four strips are attached to said container top inside wall.

7. The box of claim 4, wherein four to eight strips are attached to said container top inside wall and to each of said horizontal planar shelves.

8. The box of claim 4, wherein said tackle box further comprises one or more brackets attached to said inside vertical wall adapted to receive one of said horizontal shelves into which said shelf is slidably disposed.

9. The box of claim 4, wherein said top planar surface is removably secured to said tackle box and wherein said tackle box further comprises one or more brackets secured to one or more bottoms of said horizontal shelves, said brackets adapted to receive said top planar surface of said hook securing strip, whereby said top planar surface is removably slidably disposed in said bracket.

10. The box of claim 4, wherein said top planar surface is removably secured to said tackle box and wherein said tackle box further comprises one or more brackets secured to said container top inside wall top, said brackets adapted to receive said top planar surface of said hook securing strip, whereby said top planar surface is removably slidably disposed in said bracket.

* * * * *